(12) United States Patent
Frait et al.

(10) Patent No.: US 10,471,819 B2
(45) Date of Patent: Nov. 12, 2019

(54) HYBRID TRANSMISSION ASSEMBLY

(71) Applicant: Ford Global Technologies, LLC, Dearborn, MI (US)

(72) Inventors: Steven Anatole Frait, Milan, MI (US); Mark Thomas Weston, Plymouth, MI (US); Kyle Mattinson, Taylor, MI (US); Stanley L. Bower, Ann Arbor, MI (US); Keith A. Devereaux, Roseville, MI (US); Kevin Mackenzie, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/950,433

(22) Filed: Apr. 11, 2018

(65) Prior Publication Data

US 2019/0315221 A1 Oct. 17, 2019

(51) Int. Cl.
| | |
|---|---|
| *B60K 6/405* | (2007.10) |
| *F16H 57/04* | (2010.01) |
| *B60K 6/48* | (2007.10) |
| *B60K 6/30* | (2007.10) |
| *B60K 6/387* | (2007.10) |

(Continued)

(52) U.S. Cl.
CPC ............... *B60K 6/405* (2013.01); *B60K 6/30* (2013.01); *B60K 6/387* (2013.01); *B60K 6/48* (2013.01); *B62D 65/10* (2013.01); *F16H 57/0424* (2013.01); *F16H 57/0476* (2013.01); *H02K 5/20* (2013.01); *H02K 7/006* (2013.01); *H02K 7/02* (2013.01); *H02K 9/19* (2013.01); *H02K 11/21* (2016.01); *H02K 24/00* (2013.01); *B60K 2006/4825* (2013.01); *B60Y 2200/92* (2013.01); *B60Y 2306/03* (2013.01); *B60Y 2306/05* (2013.01); *B60Y 2410/10* (2013.01); *Y10S 903/914* (2013.01); *Y10S 903/951* (2013.01); *Y10S 903/952* (2013.01); *Y10S 903/96* (2013.01)

(58) Field of Classification Search
CPC . B60K 6/387; B60K 6/30; B60K 6/48; B60K 6/405; B60K 2006/4825; H02K 24/00; H02K 11/21; H02K 9/19; H02K 7/006; H02K 7/02; H02K 5/20; B62D 65/10; F16H 57/0476; F16H 57/0424; B60Y 2410/10; B60Y 2306/03; B60Y 2306/05; B60Y 2200/92; Y10S 903/96; Y10S 903/952; Y10S 903/914; Y10S 903/951
See application file for complete search history.

(56) References Cited

U.S. PATENT DOCUMENTS

| | | | |
|---|---|---|---|
| 6,668,953 B1 * | 12/2003 | Reik ..................... | B60K 6/08 180/165 |
| 8,322,503 B2 * | 12/2012 | Combes ................ | B60K 6/26 192/48.8 |

(Continued)

*Primary Examiner* — Erez Gurari
(74) *Attorney, Agent, or Firm* — David Kelley; Brooks Kushman, P.C.

(57) ABSTRACT

In a hybrid transmission, a traction motor is mounted between a dry clutch module and a manual gearbox. A slave cylinder is mounted within the rotor of the traction motor to reduce axial length. The rotor is fixedly coupled to an engine crankshaft. The stator may be cooled by circulating engine coolant through the housing. The stator and the rotor may be cooled by spraying transmission fluid into a sealed motor cavity.

14 Claims, 6 Drawing Sheets

(51) Int. Cl.
| | |
|---|---|
| *B62D 65/10* | (2006.01) |
| *H02K 5/20* | (2006.01) |
| *H02K 7/02* | (2006.01) |
| *H02K 7/00* | (2006.01) |
| *H02K 9/19* | (2006.01) |
| *H02K 11/21* | (2016.01) |
| *H02K 24/00* | (2006.01) |

(56) References Cited

U.S. PATENT DOCUMENTS

| | | | | |
|---|---|---|---|---|
| 8,337,359 | B2* | 12/2012 | Hofbauer | B60K 5/08 |
| | | | | 477/5 |
| 8,545,367 | B2* | 10/2013 | Hartz | B60K 6/40 |
| | | | | 477/5 |
| 8,920,275 | B2* | 12/2014 | Reitz | B60K 6/383 |
| | | | | 475/5 |
| 8,960,393 | B2* | 2/2015 | Frait | B60K 6/387 |
| | | | | 192/3.21 |
| 9,050,968 | B2* | 6/2015 | Jacobson | B60W 10/24 |
| 9,873,317 | B2* | 1/2018 | Ohnemus | B60K 6/48 |
| 10,093,163 | B2* | 10/2018 | Schmitt | B60K 6/40 |
| 2006/0289209 | A1* | 12/2006 | Grosspietsch | B60K 6/26 |
| | | | | 180/65.25 |
| 2014/0124321 | A1* | 5/2014 | Frait | B60K 6/405 |
| | | | | 192/66.3 |
| 2018/0194215 | A1* | 7/2018 | Agner | B60K 6/387 |

\* cited by examiner

HYBRID TRANSMISSION ASSEMBLY

TECHNICAL FIELD

This disclosure relates to the field of hybrid electric vehicles. More particularly, the disclosure relates to a hybrid powertrain, and method of assembly thereof, in which an integrated starter/generator is mounted within a clutch housing behind the clutch module.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

One form of hybrid powertrain utilizes an Integrated Starter Generator (ISG). Unlike a conventional starter motor, an ISG is designed to remain fixed to the crankshaft while the engine is running. As such, it can provide a number of functions such as recapture of braking energy and provision of supplemental torque that are not feasible for a conventional starter motor. Also, an ISG is typically capable of starting the engine quicker than a conventional starter motor, enabling engine shut down when the vehicle stops during a drive cycle and automatic restarting in response to release of the brake pedal. ISGs are typically mounted between the engine and the transmission, increasing the length of the powertrain and potentially decreasing powertrain stiffness.

SUMMARY

A hybrid transmission includes a housing, a shiftable gearbox, a flywheel, a clutch, and an electric machine. The housing has a bulkhead. An input shaft of the gearbox extends through the bulkhead. The gearbox may be a manual gearbox. The flywheel is adapted for fixation to an engine crankshaft. The clutch is configured to selectively couple the flywheel to the input shaft. The electric machine is mounted between the clutch and the bulkhead. A stator of the electric machine is fixed to the housing and a rotor of the electric machine is fixedly coupled to the flywheel. A resolver may be fixed to the bulkhead and configured to measure a rotational position of the rotor. An actuator may be configured to engage or disengage the clutch in response to a control signal. The actuator may be fixed to the bulkhead and radially located between the rotor and the input shaft. Nozzles may be configured to spray lubricating fluid onto the rotor and stator for cooling. The stator may be cooled by circulating coolant through the housing.

A hybrid vehicle may be assembled by installing a stator and rotor into a transmission front housing, fixing a flywheel of a clutch module to an engine crankshaft, attaching the front housing to an engine block, and securing the flywheel to the rotor hub. The flywheel may be secured to the rotor hub by reaching through an access window to install and tighten nuts onto studs wherein the studs are fixed to the flywheel and protrude through a drive plate fixed to the rotor hub. A slave cylinder may be installed within the rotor hub. A sealing wall may be fastened to the transmission front housing to create a sealed motor cavity isolated from the clutch module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Components are said to be fixedly coupled if they are connected such that they are constrained to have the same rotational velocity about the same axis of rotation in all operating conditions. Components are selectively coupled by a clutch if they are constrained to have the same rotational velocity about the same axis when the clutch is fully engaged and they are free to have distinct speeds in some other operating condition.

Figure 1:
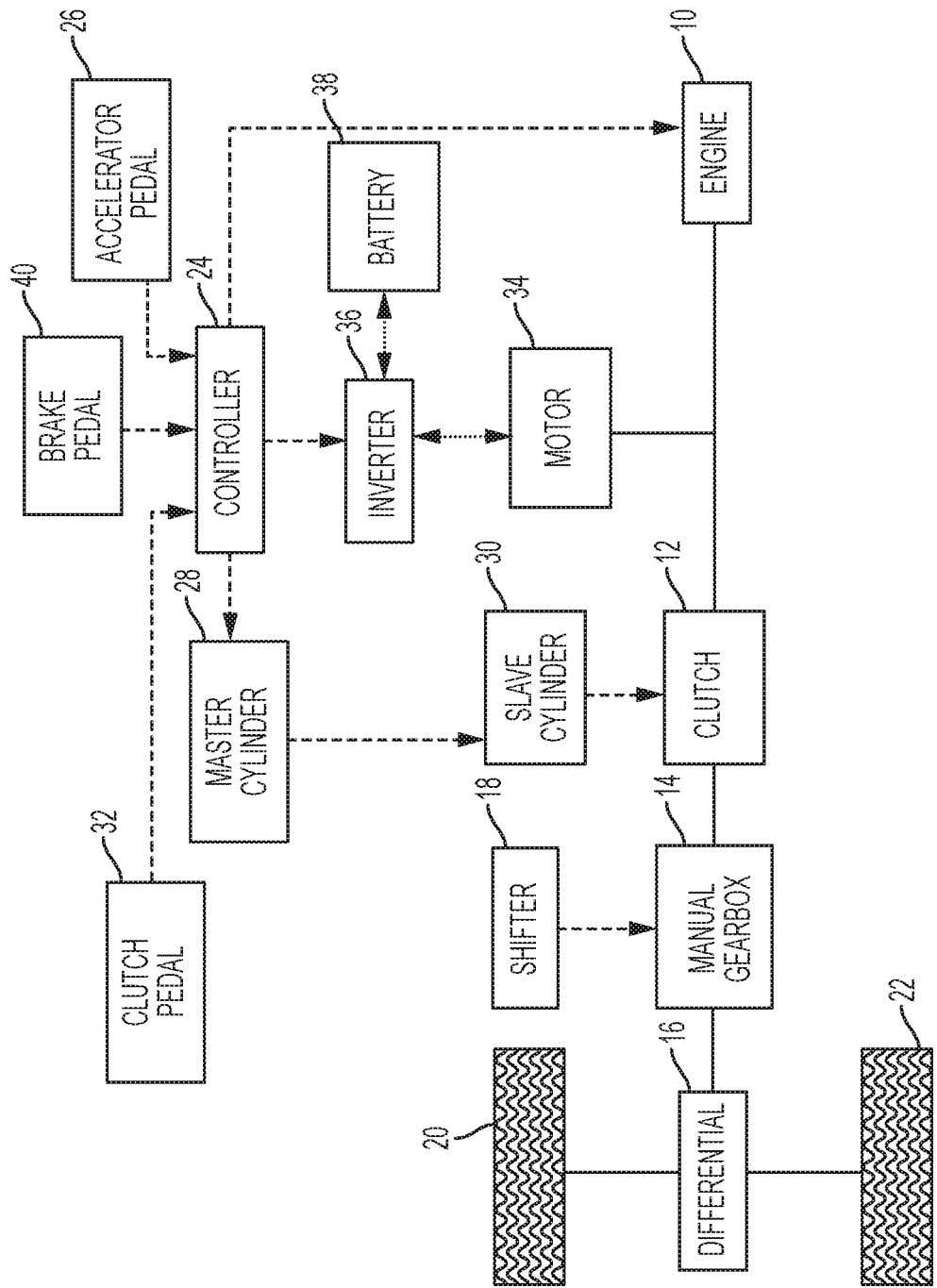
FIG. 1 is a schematic diagram of a hybrid vehicle powertrain.

FIG. 1 is a schematic diagram of a hybrid vehicle powertrain. Solid lines represent mechanical power flow connections. Bold dotted lines represent electrical power flow connections. Dashed lines represent the flow of signals. Power is provided primarily by internal combustion engine 10. Clutch 12 selectively couples the crankshaft of engine 10 to the input of gearbox 14. Gearbox 14 transmits the power to differential 16 with a speed ratio selected by the driver via shifter 18. Differential 16 divides the power between left and right drive wheels 20 and 22 respectively, allowing slight speed differences such as when the vehicle turns a corner.

Controller 24 sends signals to engine 10 to adjust the engine torque. Controller 24 determines the desired torque level primarily based on the position of accelerator pedal 26. Controller 24 also sends signals to master cylinder 28 to adjust the torque capacity of clutch 12. Master cylinder 28, in turn, sends a signal to slave cylinder 30 which directly actuates clutch 12. The control signal between master cylinder 28 and slave cylinder 30 may take the form of flow of hydraulic fluid. Controller 24 determines the desired torque capacity of clutch 12 primarily based on the position of clutch pedal 32. In some embodiments, master cylinder 28 may be directly connected to clutch pedal 32.

Motor 34 is fixedly coupled to the crankshaft of engine 10 and the input of clutch 12. (As discussed below, the input of clutch 12 may be called a flywheel.) Motor 34 is known as an Integrated Starter/Generator (ISG). As the name implies, motor 34 may be used to start engine 10 and may be used to generate electrical power to operate accessories. In addition to these functions, motor 10 may be used to converter vehicle kinetic energy to electric energy during braking maneuvers and, at other times, may be used to supplement the torque of engine 10. Motor 34 may be an Alternating Current (AC) motor such as a permanent magnet synchronous machine. Controller 24 controls the torque of motor 34 by commanding inverter 36 to adjust electric currents in stator windings of motor 34. Power is supplied to motor 34 by battery 38 and, when motor 34 is used to generate power, power is stored in battery 38. The controller determines which function to employ at a particular time and the appropriate torque level for that function based on signals from accelerator pedal 26, brake pedal 40, and clutch pedal 32, among others.

Figure 2:
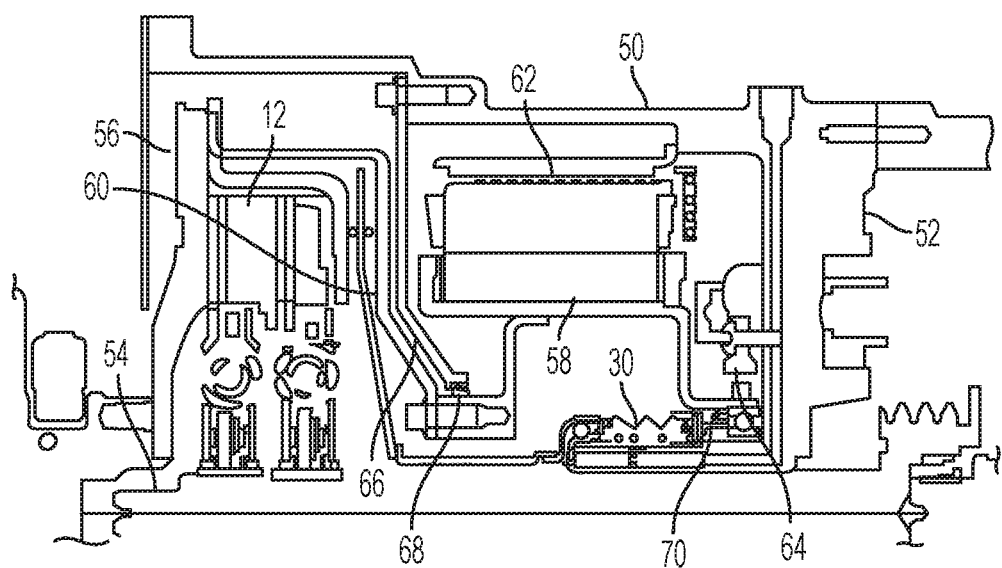
FIG. 2 is a cross section of a hybrid transmission suitable for use in the powertrain of FIG. 1.

FIG. 2 is a cross section of a portion of a hybrid transmission that includes clutch 12 and motor 34. The transmission components are supported in transmission case 50 which is mounted to vehicle structure, either directly or indirectly. Transmission case 50 includes bulkhead 52 which separates gearbox 14 from clutch 12. The portion of transmission housing 50 that contains gearbox 14 defines a sump containing lubricating fluid for gearbox components. Clutch 12 is a dry clutch which must be isolated from the lubricating fluid. Gearbox input shaft 54 extends through bulkhead 52.

Flywheel 56 is adapted for fixation to the crankshaft of engine 10. Slave cylinder 30 is fixed to bulkhead 52. Input shaft 54 passes through slave cylinder 30. In response to hydraulic fluid flowing from master cylinder 28 into slave cylinder 30, slave cylinder 30, a piston extends to actuate clutch 12. In some embodiments, clutch 12 may be normally engaged and the piston may disengage the clutch. In other embodiments, clutch 12 may be normally disengaged and the piston may engage the clutch. Ensuring correct operation of this actuation mechanism requires axial distance between the bulkhead 52 and the clutch 12, which adds to the axial length of the transmission assembly.

In the hybrid transmission of FIG. 2, motor 34 utilizes the same axial space as slave cylinder 30, thereby limiting the axial length penalty of an ISG. The back end of rotor 58 is supported by bulkhead 52 via a ball bearing. The front end of rotor 58 is supported by flywheel 56 via drive plate. One end of drive plate 60 is bolted to rotor 58 as shown in FIG. 2. The other end of drive plate 60 is fixed to flywheel 56 by studs and nuts as described below. Stator 62 is fixed to transmission case 50. Resolver 64 is mounted to bulkhead 52 and measures the rotational position of rotor 58 so that inverter 36 can set the winding currents accordingly.

In some embodiments, as described below, the motor is cooled by transmission lubricating fluid. In these embodiments, it is necessary to isolate the dry clutch 12 from the fluid. A motor cavity is formed by a sealing wall 66 bolted to the transmission case and separated from the rotor by a first seal 68. The back of the cavity is sealed by seal 70.

Figure 3:
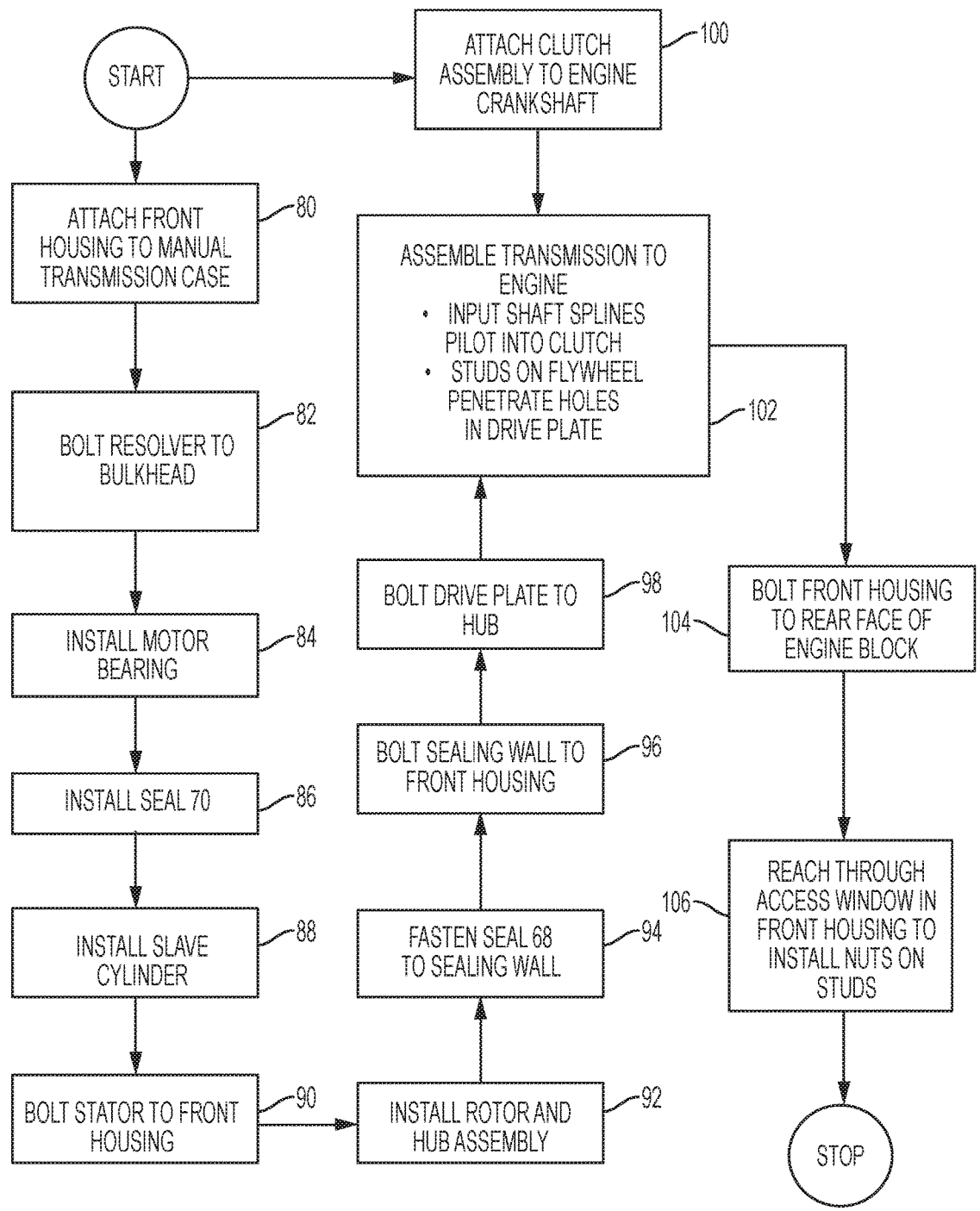
FIG. 3 is a flowchart for a process of assembling the hybrid vehicle powertrain of FIGS. 1 and 2.

FIG. 3 is a flowchart illustrating a method of assembling the hybrid powertrain of FIGS. 1 and 2. At 80, front housing 50 is bolted to the case of the manual gearbox. Note that in the embodiment of FIG. 2, bulkhead 52 is cast as part of front housing 50. In other embodiments, bulkhead 52 may be cast as part of the gearbox case or be a separate component that is bolted or otherwise fastened to the front housing. The manual gearbox is assembled into the gearbox case before this step such that input shaft 54 extends through bulkhead 52 after step 80.

At 82, resolver 64 is bolted to bulkhead 52. At 84, the motor bearing is installed. At 86, rear seal 70 is installed. At 88, the slave cylinder is installed. At 90, stator 62 is bolted to front housing 50. At 92, rotor 58, including the hub, is installed. The hub is press fit on the outer race of the bearing and contacts seal 70. The hub may include features that are sensed by resolver 64 to determine rotor position. At 94, seal 68 is fastened to sealing wall 66 which is then bolted to the front housing 50 at 96. At 98, drive plate 60 is bolted to the hub of rotor 58. These components are installed from the front. The order of assembly may be constrained by the relative diameters and positions of the components and may be different in some embodiments than shown in FIG. 3.

Figure 4:
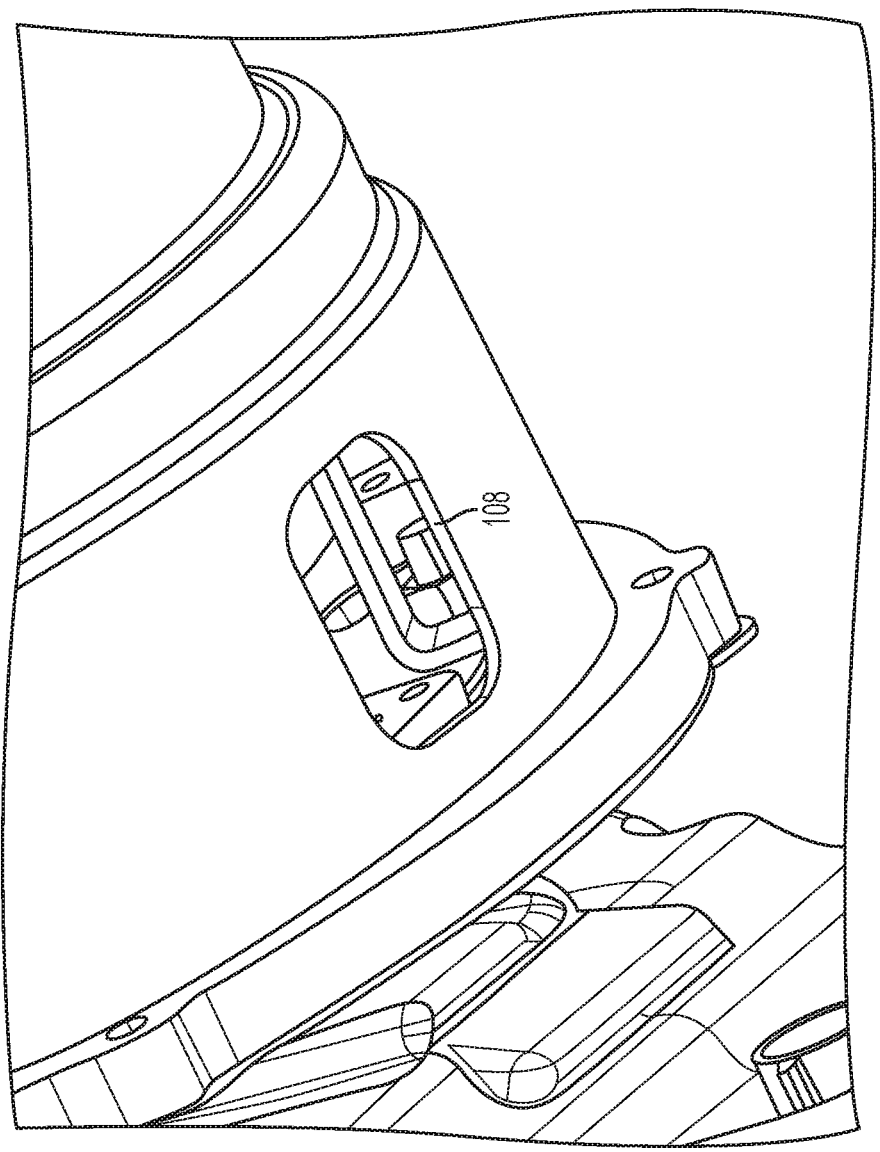
FIG. 4 is a pictorial view showing an access window for one of the steps of the process of FIG. 3.

At 100, the clutch assembly, which includes clutch 12 and flywheel 56, is attached to the engine crankshaft. This step may be performed before, after, or in parallel with steps 80 to 98. After completing steps 80 to 100, the transmission and the engine are brought together at 102. As they are brought together, input shaft 54 splines with the hub of clutch 12. Flywheel 56 includes a number of studs which fit through corresponding holes in drive plate 60. After the two assemblies are brought together, the engine case and front housing are bolted to one another at 104. Finally, nuts are threaded onto the studs at 106 and tightened. Access to the rear side of drive plate 60 to install the nuts is via an access window in the bottom of housing 50, as shown at 108 in FIG. 4. It may be necessary to rotate the crankshaft and rotor to align each stud with the access window.

Figure 5:
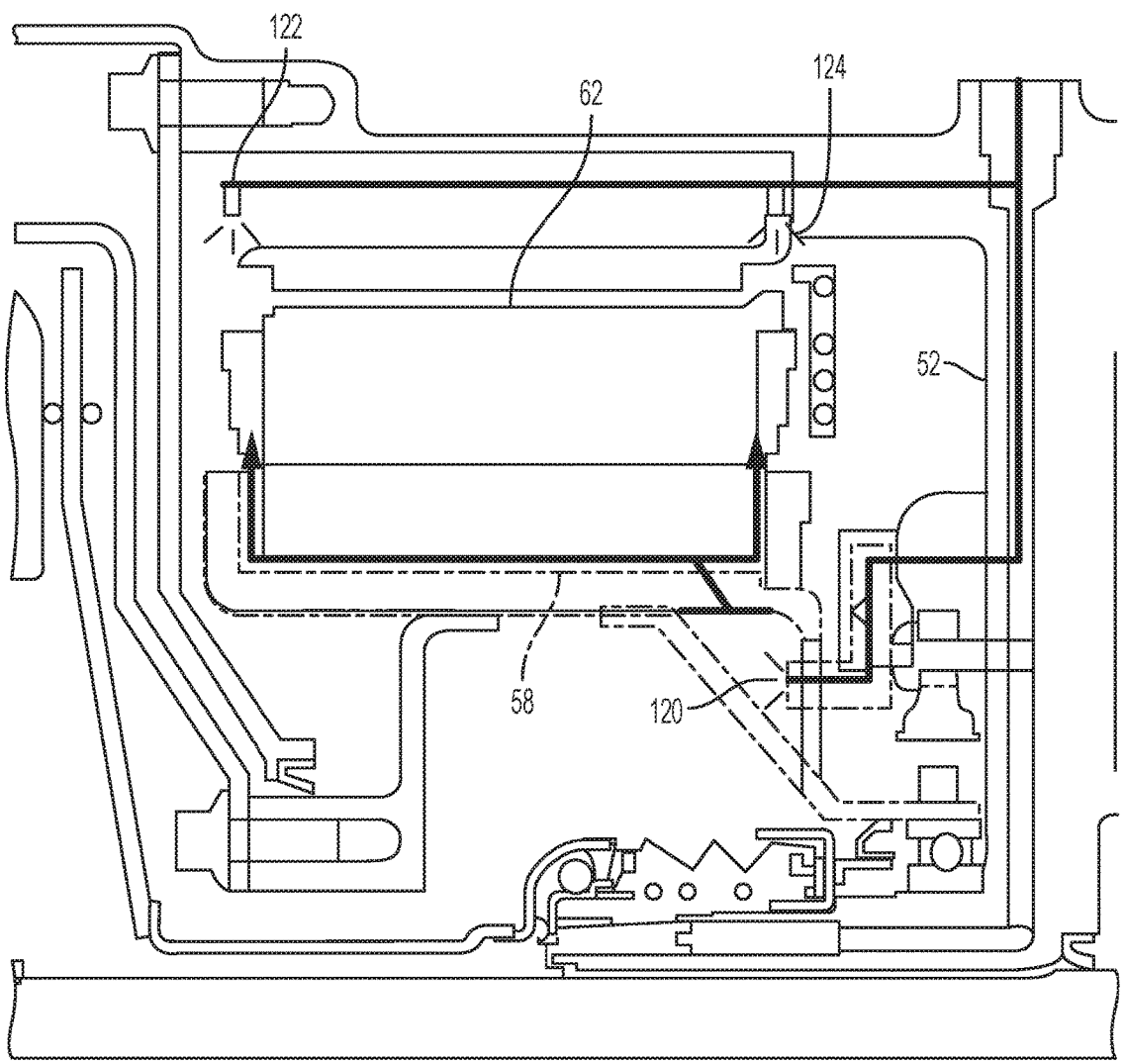
FIG. 5 is a cross section of a portion of a lubricating fluid cooled variant of the transmission of FIG. 2.

FIG. 5 illustrates a variant of the hybrid transmission of FIG. 2 in which several nozzles are positioned to cool motor 34. A lubricating fluid is pumped from a sump in the transmission case to various gearbox components to lubricate and cool those components. Some of that fluid is diverted and routed through channels in housing 50 and bulkhead 52 to cool the motor. A first nozzle 120, attached to bulkhead 52, sprays lubricating fluid on the inside of rotor 58. As the rotor turns, centrifugal forces propel the fluid radially outward. The rotor and hub may include features to guide the fluid around the rotor to maximize cooling effectiveness. Other nozzles 122 and 124 spray lubricating fluid onto the stator. This fluid flows from the top of the stator to the bottom due to gravity. A passage connects the lower portion of the motor cavity to the transmission sump such that the fluid can drain back.

Figure 6:
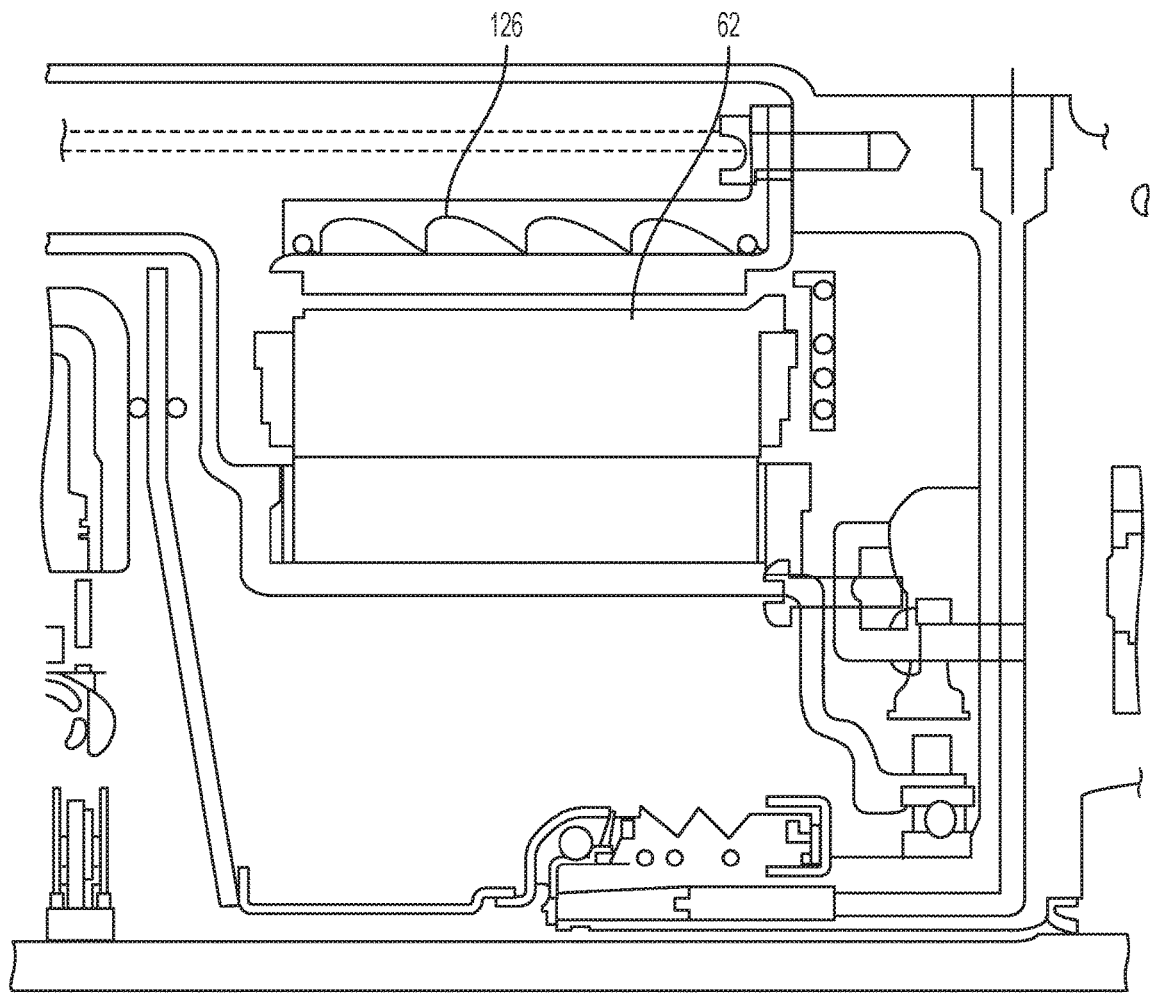
FIG. 6 is a cross section of a portion of a water cooled variant of the transmission of FIG. 2.

FIG. 6 illustrates a variant of the hybrid transmission of FIG. 2 in which the stator is cooled by engine coolant or other liquid coolant. Water jacket 126 is attached to or integrally formed with housing 50. Coolant is circulated through the water jacket and then through a radiator to dissipate heat from the stator to ambient air.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A hybrid transmission comprising:
   a housing having a bulkhead;
   a shiftable gearbox having an input shaft extending through the bulkhead;
   a flywheel adapted for fixation to an engine crankshaft;
   a clutch configured to selectively couple the flywheel to the input shaft; and
   an electric machine mounted between the clutch and the bulkhead, the electric machine having a stator fixed to the housing and a rotor fixedly coupled to the flywheel.

2. The hybrid transmission of claim 1 further comprising a resolver fixed to the bulkhead and configured to measure a rotational position of the rotor.

3. The hybrid transmission of claim 1 further comprising an actuator configured to engage or disengage the clutch in response to a control signal, the actuator fixed to the bulkhead and radially located between the rotor and the input shaft.

4. The hybrid transmission of claim 1 wherein the gearbox is a manual gearbox.

5. The hybrid transmission of claim 1 further comprising a first nozzle configured to spray lubricating fluid onto the rotor to cool the rotor.

6. The hybrid transmission of claim 5 further comprising a second nozzle configured to spray the lubricating fluid onto the stator to cool the stator.

7. The hybrid transmission of claim 1 wherein the housing is configured to circulate coolant around the stator to cool the stator.

8. A hybrid vehicle comprising:
   a housing having a bulkhead and fixed to an engine block;
   a shiftable gearbox having an input shaft extending through the bulkhead;
   a flywheel fixed to an engine crankshaft;
   a clutch configured to selectively couple the flywheel to the input shaft; and
   an electric machine mounted between the clutch and the bulkhead, the electric machine having a stator fixed to the housing and a rotor fixedly coupled to the flywheel.

9. The hybrid vehicle of claim 8 further comprising a resolver fixed to the bulkhead and configured to measure a rotational position of the rotor.

10. The hybrid vehicle of claim 8 further comprising an actuator configured to engage or disengage the clutch in response to a control signal, the actuator fixed to the bulkhead and radially located between the rotor and the input shaft.

11. The hybrid vehicle of claim 8 wherein the gearbox is a manual gearbox.

12. The hybrid vehicle of claim 8 further comprising a first nozzle configured to spray lubricating fluid onto the rotor to cool the rotor.

13. The hybrid vehicle of claim 12 further comprising a second nozzle configured to spray the lubricating fluid onto the stator to cool the stator.

14. The hybrid vehicle of claim 8 wherein the housing is configured to circulate engine coolant around the stator to cool the stator.

* * * * *